G. W. ODELL.
COMPUTING CARD STAMPING MACHINE.
APPLICATION FILED JULY 7, 1919.
1,406,067.
Patented Feb. 7, 1922.
5 SHEETS—SHEET 1.
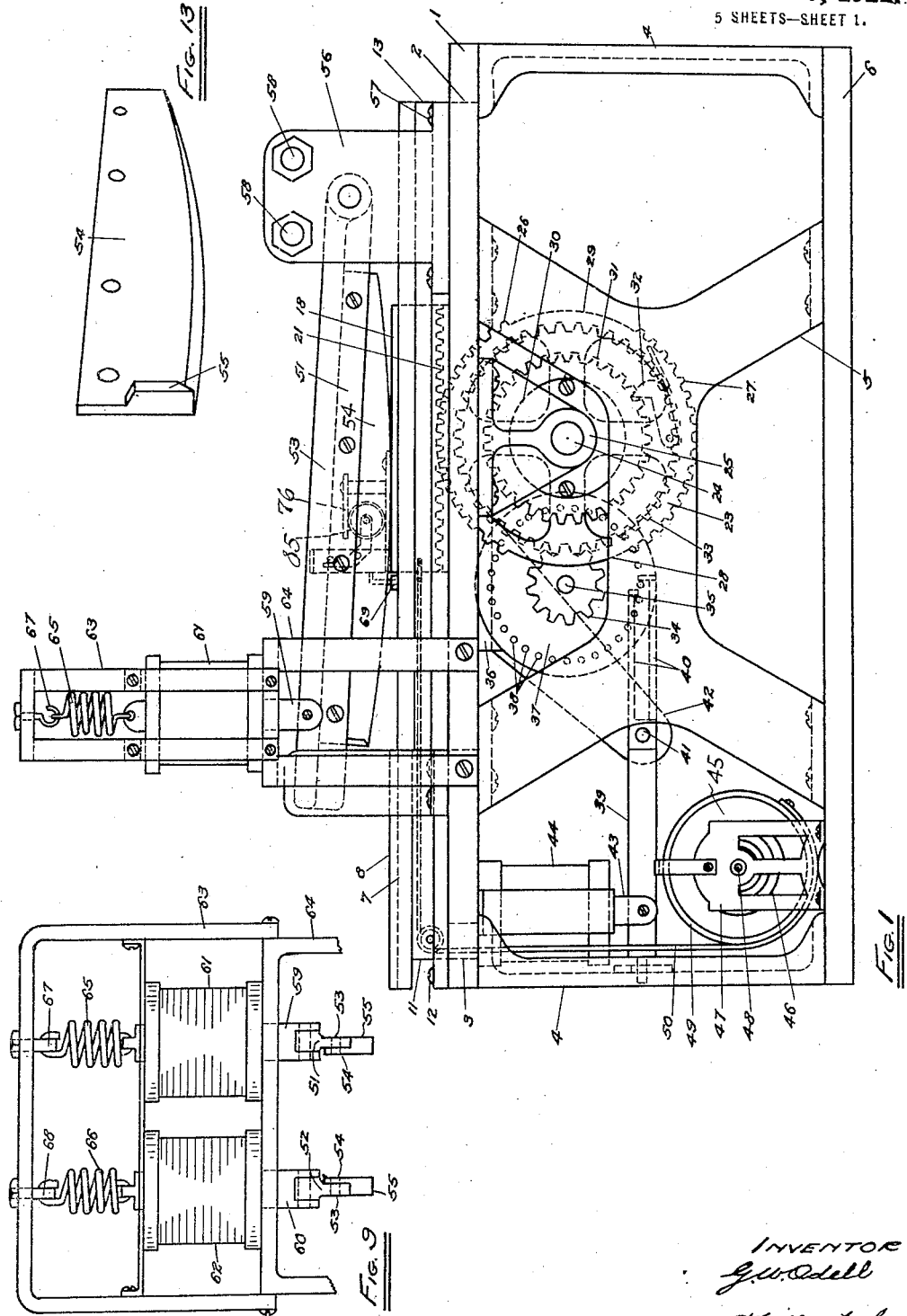
INVENTOR
G. W. Odell
By Featherstonhaugh
Atty G. W. ODELL.
COMPUTING CARD STAMPING MACHINE.
APPLICATION FILED JULY 7, 1919.
1,406,067.
Patented Feb. 7, 1922.
5 SHEETS—SHEET 2.
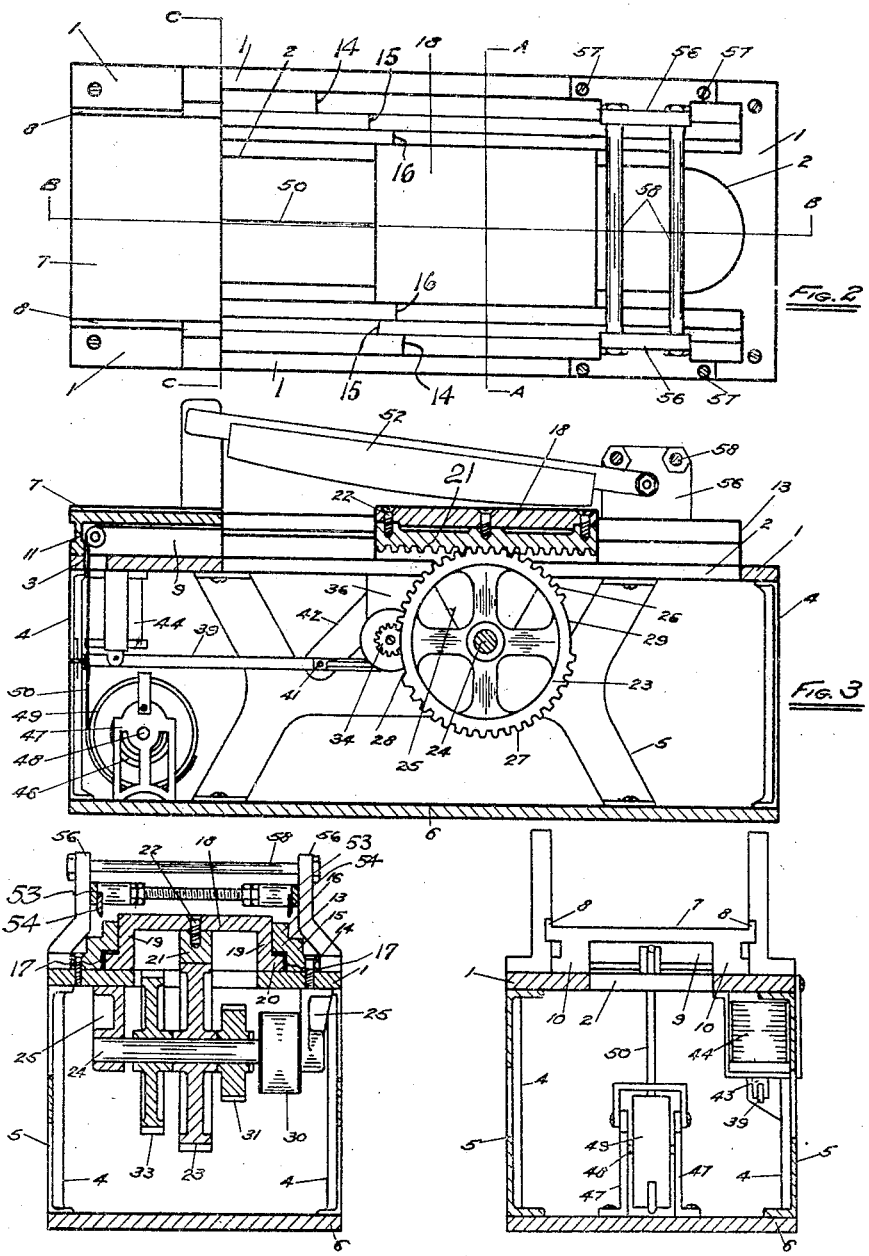

G. W. ODELL.
COMPUTING CARD STAMPING MACHINE.
APPLICATION FILED JULY 7, 1919.
1,406,067.
Patented Feb. 7, 1922.
5 SHEETS—SHEET 3.
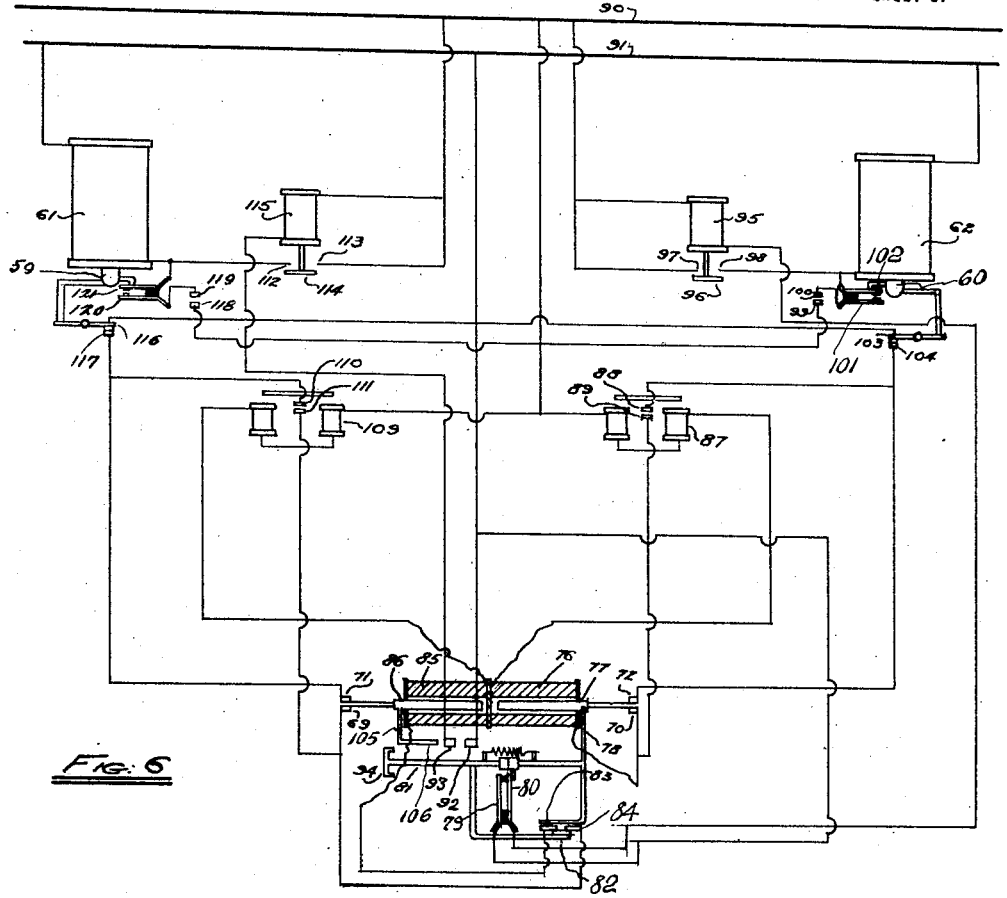
INVENTOR
G. W. Odell
By [signature]
Att'y

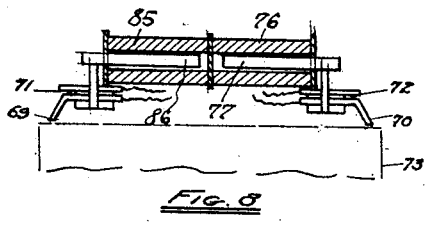
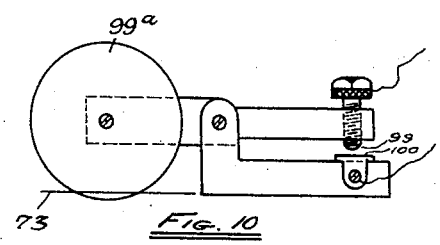
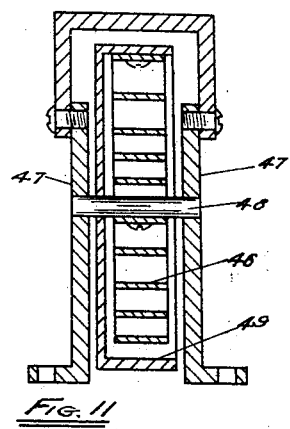
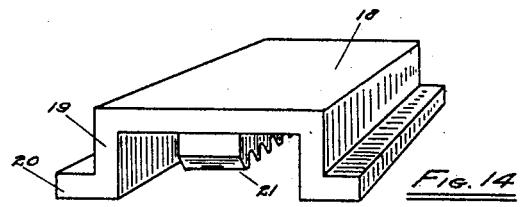
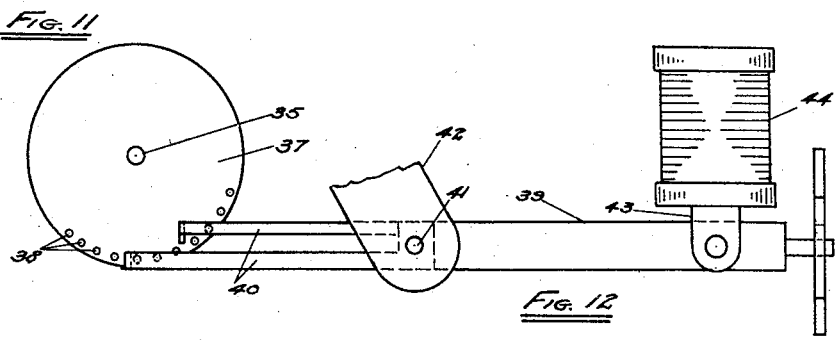
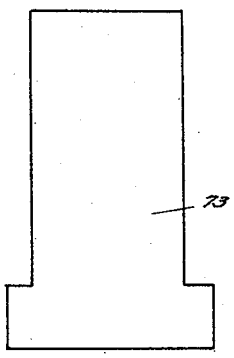
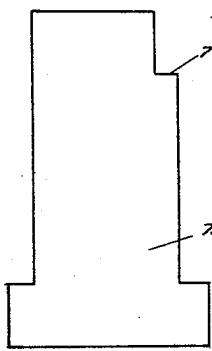
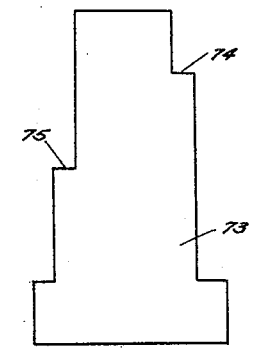

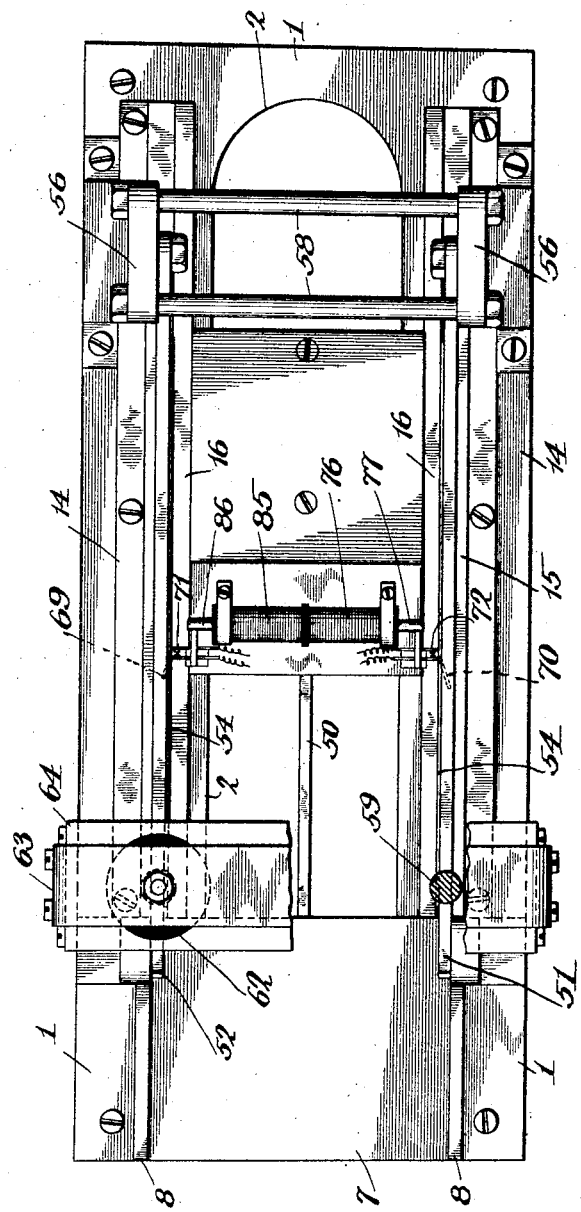

UNITED STATES PATENT OFFICE.

GEORGE WILLIAM ODELL, OF MONTREAL, QUEBEC, CANADA, ASSIGNOR TO COMPUTING-TABULATING-RECORDING COMPANY, OF NEW YORK, N. Y., A CORPORATION OF NEW YORK.

COMPUTING-CARD-STAMPING MACHINE.

1,406,067.  Specification of Letters Patent.  Patented Feb. 7, 1922.

Application filed July 7, 1919. Serial No. 309,189.

*To all whom it may concern:*

Be it known that I, GEORGE WILLIAM ODELL, a subject of the King of Great Britain, and residing at 298 St. James Street, in the city and district of Montreal, in the Province of Quebec, in the Dominion of Canada, have invented a new and useful Computing - Card - Stamping Machine, of which the following is the specification.

The invention relates to a time card stamp as described in the present specification and illustrated in the accompanying drawings that form part of the same.

The invention consists essentially of the novel construction and arrangement of parts, whereby the action of the stamp in relation to the card is governed by the operation of the mechanism actuated synchronically with the lasping of time.

The objects of the invention are to stamp out cards in a suitable shape to act as instruments in the operation of a recording machine; to stamp the cards precisely in correspondence with the elapsed time since the first stamping and thereby insure accuracy in measuring the time of a workman; to eliminate complications in time measuring mechanisms and by simple mechanical and electrical means effect the shaping of the card automatically in synchronism with a clock or other timepiece; to facilitate the handling of small and large bodies of workmen, particularly in regard to their wage earnings; to reduce the clerical work required in computing wages and costs and consequently economize greatly in the matter of overhead charges; and generally to provide an efficient, durable and serviceable machine for preparing a card for a calculating machine.

In the drawings, Figure 1 is a side elevation of the machine.

Figure 2 is a plan view of the machine on a reduced scale with the superstructure removed.

Figure 3 is a longitudinal sectional view on the line B—B in Figure 2.

Figure 4 is a cross sectional view on the line A—A in Figure 2.

Figure 5 is a cross sectional view of the machine on the line C—C in Figure 2.

Figure 6 is a diagrammatic view, showing the plan of wiring for the card electrical contacts and knife operating mechanism.

Figure 7 is a diagrammatic view, showing the plan of wiring for the clock connections to the card stop operating mechanism.

Figure 8 is a detail, showing the card electrical contacts.

Figure 9 is a fragmentary view of the machine showing the superstructure.

Figure 10 is a detail of the rolling electrical switch.

Figure 11 is a sectional detail of the spring return mechanism apart from the machine.

Figure 12 is a detail of the escapement mechanism.

Figure 13 is a detail of one of the knives.

Figure 14 is a perspective detail of the movable card stop.

Figure 15 is a detail of a card previous to being stamped out.

Figure 16 is a detail of a card following the first cutting.

Figure 17 is a detail of a card after the final operation of the machine.

Fig. 18 shows a top plan view of the machine with certain parts of the knife solenoid carrying frame broken away.

Like numerals of reference indicate corresponding parts in each figure.

Referring to the drawings, the table 1 is shown as formed in rectangular shape, having a longitudinal opening 2 terminating adjacent to the rear end of the table and a belt hole 3 near the front end.

The table 1 is supported on the four corner posts 4 and the intermediate standards 5, which are screwed to the table and to the base 6, the latter being in the form of a plate.

This completes the frame of the machine and it is on this frame that all the brackets and operating parts are supported with the exception of the timepiece, which forms no part of this invention.

The card tray 7 is formed with a flat top for a feed surface and flanges 8, one at each longitudinal edge of the feed surface and forming guides in directing the card into the machine.

The tray 7 is recessed at 9 from the inner end forming side flanges 10 joining a front flange 11, the tray standing on said flanges on the front portion of the table 1 and extending inwardly to the opening 2 and secured by the screws 12.

The longitudinal guide bars 13, Figs. 2, 3 and 4 are in angle form, each having a vertical section 14 secured to the table 1 by screws, an intermediate section 15, and a horizontal section 16 extending inwardly towards the edge of the opening 2. The guide bars 13 also have an interior cut away portion 17 which has walls projecting upwardly and to the inside to form a bearing for the stop.

The guide bars 13 with the table surface form tracks at each side of the opening 2 and in and on these tracks the sliding stop 18 is introduced, the stop being in plate form and having the downwardly projecting flanges 19 from its longitudinal edges and the outwardly projecting flanges 20 from the lower end of the flanges 19, the flanges 19 engaging the inner surfaces of the vertical sections 17 and the flanges 20 sliding on the table top under the horizontal sections 16.

The toothed rack 21 is secured to the underside of the stop 18 in the centre thereof by the screws 22 and extends the full length of the stop.

The driving gear wheel 23 coacts with the rack 21 and is mounted on the shaft 24 journalled in the hangers 25, and is formed with the segmental toothed portions 26 and 27 separated by the smooth rim portions 28 and 29, this gear being actuated by a spring in the casing 30.

The gear wheel 31 is engaged by the spring pawl 32 rigidly secured to the driving gear 23.

The escapement mechanism is formed with the gear wheel 33 fixed in operative relation to the driving gear wheel 23 and coacting and held by the pinion 34 mounted on the shaft 35 journalled in the hanger 36, the shaft 35 also carrying the escapement wheel 37, having the radial pin projections 38, which are engaged by the escapement rod 39 at its forked end 40, one finger of the fork holding, while the other passes as customary.

The escapement rod is pivoted on the pin 41 secured in the bracket 42, the latter being rigid with the hanger 36.

The other end of the escapement rod 39 is pivotally secured to the core 43 of the solenoid winding 44, so that the movement of said core against its tendency to drop by gravity through the energization of the winding 44 tilts the escapement rod and releases the escapement wheel to the extent of one radial pin, which in consequence of a common mounting allows turning of the pinion 34 and the driving gear 23 as the latter is constantly subject to the action of the spring and only held still by the escapement in an arrangement similar to many clock mechanisms.

The solenoid 44 is electrically connected to the clock 45, so that every five minutes or any other period of time, the solenoid 44 is energized, which has the effect of picking up the escapement rod 39 to bring in the periodical operation of the escapement mechanism.

By this arrangement, the card stop 18 is operated along the table 1 on its tracks, being moved towards the rear end of the table a set distance every five minutes. As soon as the segmental portion 26 of the gear 23 has finished its operation of taking the stop 18 to the rear end of the table 1, then the smooth rim portion 28 is turned under the rack and as there are no teeth to hold the stop 18, the latter is quickly returned to the tray 7 to commence its operations once more in travelling to the rear end of the table, this time being propelled by the segment 27, until the smooth rim portion 29 is reached, when the same return action occurs.

The spring 46 contained in the frame 47 is wound on the spindle 48, which also carries the drum 49.

The cable 50 winds on the drum 49 and extends through the table and under the tray 7 to the stop 18, where it is secured. Immediately that the segmental gear teeth release the rack there is nothing to hold the stop 18 from being pulled by the spring 46, consequently it very quickly replaces the stop in its starting position at the end of the predetermined period of time over which the machine operates.

The knives 51 and 52 are each formed with the back 53 to which the blade 54 is secured, the latter having an outturned extremity 55 to finish the clipping from the card and form the shoulder required. The blades 54 engage with the sides of the guides 16 (Figs. 4 and 18) in a scissor-like action to cut the card.

The backs 53 are pivotally secured in the bracket 56 rigidly secured to the table 1 by the screws 57 and braced by the tie bolts 58.

The front ends of the knife backs 54 are pivotally secured to the solenoid cores 59 and 60 of the solenoid windings 61 and 62. The solenoids 61 and 62 are supported in the frame 63, which is mounted on the frame 64 secured to the table 1.

The upper ends of the cores 59 and 60 are suspended by the springs 65 and 66 from the hooks 67 and 68 secured to the upper end of the frame 63.

The solenoids 61 and 62 are included in a plan of electric wiring more specifically set forth hereinafter in a description of the electric features. It is sufficient to say here that the spring electrical switch contacts 69 and 70 are supported from the switchboard mechanism secured to the front of the stop 18 and on being pressed inwardly toward the stop close circuits in coaction with the switch contacts 71 and 72.

The card 73 to be clipped is itself the instrument for operating the contacts 69 and 70, engaging them edge on as it is thrust in toward the stop (Fig. 8).

The card 73 in its uncut state first operates both contacts 69 and 70, but one of these contacts in completing the electrical connections controlled by it cuts out the circuit controlled by the other contact, consequently only one knife will operate as only one solenoid will be energized and as the drawing in of said core against the spring pull pushes the knife downwardly the card will be clipped on one side only. The spring pulls the knife upwardly on the de-energization of the solenoid and places the machine in readiness for the second operation. Here again upon the insertion of the card the card engages an electrical contact, but only one as the card has been already clipped thereby providing clearance between the card and the other contact, therefore the card operates the knife on the unclipped side and as the stop has since travelled a considerable distance, if the elapsed time is a good part of a day, the clipping this time is much deeper into the card with the result that two shoulders 74 and 75 are formed and it is the distance between these shoulders along a longitudinal line through the card that measures the time between the first and second operations.

The following is a brief description of the electrical operation:—

In Figure 6 one plan of wiring suitable for the operation of the knives is shown and in this figure 69 and 70 are the spring switch contacts and 71 and 72 are the relatively rigid contacts, all carried by the stop as explained.

From the contacts 69 and 71 the main left hand circuit extends and from the contacts 70 and 72 the main right hand circuit extends.

The plan of operation is, as aforesaid, to first cut out one circuit, while the other is operating, thus the left hand circuit will be cut out automatically and the right hand circuit energizd. There are several ways of doing this to any one versed in the art of electricity, but herein a comparatively simple arrangement is shown.

At the right hand the solenoid 76 is connected through its core 77 to the contacts 70 and 72 and from the core an arm 78 extends to a switch contact 80, which coacts with a switch contact 79 and when the core 77 is drawn in, the arm 78 closes the switch contacts 79 and 80 and simultaneously draws the contacts 70 and 72 to the left and out from under the path of the knife, that is to do the cutting. (Figs. 6 and 8.) An auxiliary arm 81 extends from the arm 78 so as to be moved to the left upon the inward movement of core 77. This arm 81 carries the bridge switch contact 82 and this spans and electrically connects the contacts 83 and 84, the latter being connected to the switch contact 69 and the former to the solenoid 85 having the core 86.

The switch electro-magnet 87, operating the switch contact 88 to the contact 89, is included in the circuit energized and this magnet is connected to the electric power represented by the line wire 90, while the other line wire 91 is connected to the switch contact 79 coacting with the contact 80 and also to the switch contact 92 coacting with the switch contact 93 in the operation including the solenoid 85.

It will now be seen that drawing in the core 77 in the manner described closes the switch contacts 79 and 80 and parts the switch contacts 83 and 84, therefore the closing of the contacts 69 and 70 which takes place shortly after the closure of contacts 70 and 72 (due to the greater length of contact 70, see Fig. 18), has no effect whatever for the solenoid 85 is cut out and the switch contacts 92 and 93 separated, thereby cutting off communication from contact 93 with the line wire 91.

The uncut card naturally operates both contacts 69 and 70, consequently this cut out plan of wiring is essential, where the contacts are arranged as shown or substantially so.

The switch contacts may be held open if desired by means of a hook 94 which normally lies over the top of the card and which upon the movement of arm 81 to the left is adapted to hook over side of the card and prevent the return of arm 81 to the right until the card is removed from the machine. Such an arrangement is not essential since other means are provided for restoring arm 81 to the left and reclosing contacts 83—84.

If the hook construction is employed the bar 81 should preferably have a lost motion spring connection with part 78 to permit this part to return upon the de-energization of solenoid 76 and thereby break the circuit through contacts 79 and 80. This hook arrangement is not absolutely essential but provides an additional interlock which in certain cases may be desirable.

The switch electro-magnet 95 is connected to line wire 90 and contact 80, consequently on the closing of contacts 79 and 80 the current flows from line 91 through contacts 79—80 and back through electro-magnet 95 to line 90. In this way the electro-magnet 95 is energized and its armature 96 forming a switch member connects electrically the contacts 97 and 98, which brings the solenoid 62 into the energized electric circuit, the solenoid 62 being also connected to the line wire 91. The core 60, which is spring-held to its upper position, is drawn in to the winding in the usual manner and actuates the knife with the result that the card is clipped on that side.

It is desirable in order to avoid coincident operation of the knives to establish an independent branch connection from the switch contact 99 leading to the line wire 90. The switch contact 99 is brought into engagement with the switch contact 100, both mounted on the tray 7, by the insertion of the card under roller 99ª (Fig. 10). The contact 100 is permanently connected with the switch contact 101 and the latter coacts with the switch contact 102 electrically connected with the solenoid 62. The switch contacts 103 and 104 are in the main right hand operating circuit and are normally closed, but the descent of the knife opens them by an extension from the core 60 contacting with contact 103 (see Fig. 6). In consequence the solenoid 76, the switch electro-magnet 95, the switch electro-magnet 87, the switch contacts 70 and 72, and the switch contacts 79 and 80 are cut out and the connection of the switch contacts 83 and 84 readjusted, but breaking of the main operating circuit establishes a new connection, for the switch contacts 101 and 102 are brought together by the descent of core 60 and as contacts 99 and 100 have been connected by the card, there is an uninterrupted connection between the two line wires 90 and 91 including the knife operating solenoid 62, therefore the core 60 is still magnetically held by the coil, thereby keeping the knife to its lower position, until the card is withdrawn and avoiding any possibility of a double operation.

The next operation concerning the card is the cutting out of the other side and this as a rule does not occur for some hours afterwards, consequently the stop has travelled some distance, which promises a much deeper cut in the card.

The card is inserted and as the right hand side is cut away to the shoulder 74, there is nothing to engage the contact 70, which is thus left undisturbed.

The contact 69 is however engaged by the uncut card on the other side and is brought into engagement with the contact 71 and this energizes the solenoid 85 and by this means the contacts 69 and 71 are withdrawn from the path of the knife 51, being connected to the core 86. The arm 105 is also connected with the core 86 and through its offset 106 engages the switch contact 92 and brings it into engagement with the switch contact 93, which is directly connected to the line wire 91.

It has already been explained that by readjustment of the right hand circuit to its normally open state, the switch contacts 83 and 84 have been reconnected and in consequence there is now an electrical connection established, which includes the switch electro-magnet 109, that operates the switch contact 110 into engagement with the switch contact 111. The closing of the switch contacts 110 and 111 is followed almost instantaneously by the connection of the switch contacts 112 and 113 by the armature 114, being a switch member operated by the switch electro-magnet 115 and then the solenoid 61 is energized which brings down the core 59 against the upward spring pressure and consequently the knife 51.

The descent of the knife opens the switch indicated diagrammatically by the switch contacts 116 and 117 in the same manner as described for the right hand part of the system, and by this means the main operating circuit is broken and the solenoid 61 kept energized to hold the knife down and prevent double operation by the branch connection to the line wire through the card operated switch contacts 118 and 119 and the switch contacts 120 and 121 closed by the descent of the knife 51.

The removal of the card re-establishes all these contacts to their original positions and it will be found that the card has a deeper cut on the opposite side forming the shoulder 74 and completing the card as an instrument of operating another machine and receiving the record.

In the operation of the escapement mechanism controlling the periodical movement of the stop 18, the switch contacts 122 and 123 are closed every five minutes or other chosen period by the minute hand or in the works as found desirable, the same being common practice in electrical clock mechanism.

The contacts 122 and 123 are connected to the power represented by the line wires 124 and 125 through the resistance 126, which is constructed to magnetize the armature 127 forming a switch operating member. The line wire 125 is connected through to the solenoid 44 and the line wire 124 is connected to the solenoid 44 through the switch contacts 128 and 129, the contact 129 being brought into engagement with the contact 128 by the armature 127. The core 43 is thus operated, which swings the escapement rod and releases the escapement wheel and thereby puts the driving gear into active engagement with the rack and stop to the extent of one pin tooth of the escapement wheel.

Briefly the operation of the machine is as follows:—

The card in its original state as handed to a workman is inserted by the man into the machine along the tray and under the time switches, that hold the operating knives down pending the removal of the card.

The man pushes in the card until it reaches the stop and consequently the electrical spring contacts and these are moved in to make the electrical connections and the cut is made, which removes the piece from the card.

The workman proceeds to his duties and on the completion of a job or at the finish of the day or part day, he again takes the card and inserts it into the machine and this time the card goes in deeper by reason of the travel of the stop synchronically with the clock, therefore the cut made at the second operation and on the other side of the card marks the distance in time travelled by the stop, since the man first entered on his work.

The details of operation have been fully described hereinbefore, so all that is necessary to say in addition is that a considerable variation may be made in the manufacture of this machine, without departing from the spirit of the invention, and so long as such changes are within the scope of the claims for novelty, the protection accorded shall not be invalidated.

What I claim is:—

1. In a computing card stamp, a frame, a plurality of knives suitably mounted in said frame, a distance measuring member and means for automatically selecting and operating said knives in accordance with the uncut and partly cut condition of the card.

2. In a computing card stamp, a frame, a plurality of knives suitably mounted in said frame, a distance measuring member and electrical means for automatically selecting and operating said knives in accordance with the uncut and partly cut condition of the card.

3. In a computing card stamp, a frame, a plurality of knives suitably mounted in said frame, a distance measuring member and electrical means having contact members travelling with said distance member for automatically selecting and operating said knives in accordance with the uncut and partly cut condition of the card.

4. In a computing card stamp, a frame, a plurality of knives suitably mounted in said frame, a distance measuring member and electrical means synchronically operating with the lapsing of time and actuated in the stamping operations by the card for automatically selecting and operating said knives in accordance with the uncut and partly cut condition of the card.

5. In a computing card stamp, a frame, a timepiece, a travelling card stop mounted in said frame and operatively connected by electric means to said timepiece, pivotally mounted knives and electric means for operating said knives actuated by the card.

6. In a computing card stamp, a frame, a timepiece, a sliding stop, electric means operatively connecting said stop and timepiece, a pair of knives, one on each side of the stop and pivotally mounted in said frame, electrical switch contacts mounted on said stop, electric machines electrically connected with said contacts for operating said knives and electric means for cutting out the operating means for one knife whilst the other is making its cut.

7. In a computing card stamp, a frame, a timepiece, a slidable stop electrically connected to said timepiece and mounted on said frame, electric switch contacts carried by said stop, a pair of knives pivoted, one at each side of said stop in said frame, electromagnetic members operatively connected with said knives and energized by the engagement of the card with said switch contacts and an electrically operated cut-out for the electro-magnetic members belonging to the knife doing the second operation.

8. In a computing card stamp, a frame, a timepiece, a slidable stop electrically connected to said timepiece and mounted on said frame, a rack mounted on the underside of said stop, a spring driven gear coacting with said rack and supported by said frame and suitably journalled, an escapement mechanism controlling the movement of said gear by periods, an electro-magnetic member astuated by said timepiece, stamping members and means for operating said stamping members.

9. In a computing card stamp, a frame, a timepiece, a slidable stop mounted on said frame and electrically connected to said timepiece, fixed switch contacts secured to said stop, spring electric contacts coacting with said fixed contacts, electro-magnetic switch members co-operating with said contacts, solenoids having spring-held cores in electric connection with said magnets and contacts and a source of power, pivotal knives attached to said cores and means for selecting the operation of one knife and withholding the operation of the other.

10. In a computing card stamp, a frame, a timepiece, a slidable stop mounted on said frame and electrically connected to said timepiece, coacting electric contacts carried by said stop, electro-magnetic switch members, a pair of pivotally mounted knives, circuit breaking switches operated by the descent of said knives and electrically connected to said coacting switch contacts and said magnetic members, the latter being energized from a source of power, solenoids having spring-held cores attached to said knives and included in the circuit with said switch members and contacts, one of said electro-magnetic members forming a cut-out for one of said solenoids, and switch members having contacts held in engagement by the inserted card and contacts brought into operative engagement by the descent of a knife and establishing a temporary electric circuit energized by the source of power and including the actuated knife solenoid and maintaining the magnetism on the core until the card is withdrawn and the temporary circuit broken.

11. In a computing card stamp, a frame, a stop slidably supported thereby, means for causing said stop to operate at intervals synchronically with the lapsing of time, stamping members and means actuated by the card for selecting the stamping member.

12. In a computing card stamp, a frame, a stop slidably supported thereby, a motive power, a gear operated thereby and engaging said stop, a gear mechanism holding the aforesaid gear from operation, an escapement wheel, an escapement rod having a forked end, electric means for operating the latter at intervals, and stamping members.

13. In a computing card stamp, a frame, a stop slidably supported thereby, a motive power, a gear operated thereby and engaging said stop, a gear mechanism holding the aforesaid gear from operation, an escapement wheel, an escapement rod having a forked end, a solenoid suitably energized and having a core pivotally secured to said rod for operating the latter at intervals, and stamping members.

14. In a computing card stamp, a frame, a stop slidably supported thereby, a motive power, a gear operated thereby and engaging said stop, a gear mechanism holding the aforesaid gear from operation, an escapement wheel, an escapement rod having a forked end and pivotally secured towards said forked end, a solenoid having a core pivotally secured to the long end of said rod and returning to normal position by gravity, and stamping members.

15. In a computing card stamp, a frame having a table supported from a base, a slot in the table and a tray recessed in the underside and flanged on the outer edges and secured to said table in front of said slot, a stop operating on said table over said slot, means for moving said stop from the tray to the rear end of the table synchronically with the lapsing of time, means for automatically returning the stop to the starting point, and stamping members.

16. In a computing card stamp, a frame having a table supported from a base, a slot in the table and a tray recessed in the underside and flanged on the outer edges and secured to said table in front of said slot, a stop operating on said table over said slot, means for moving said stop from the tray to the rear end of the table synchronically with the lapsing of spring time, means for automatically returning the stop to the starting point, and stamping members.

17. In a computing card stamp, a frame having a table supported from a base, a slot in the table and a tray recessed in the underside and flanged on the outer edges and secured to said table in front of said slot, a stop operating on said table over said slot, means for moving said stop from the tray to the rear end of the table synchronically with the lapsing of time, a spring reel connected by a cable around a pulley under said tray to said stop for automatically returning said stop to its starting point, and stamping members.

18. In a computing card stamp, a frame having a slotted table supported from a base, a tray on said table in front of said slot having guide flanges and a recessed underside, a stop downwardly and outwardly flanged and mounted on said table, flanged guide bars forming bearings and guides for said stop, a rack secured to the underside of said stop, a gear mechanism engaging said rack, a motive power, an escapement mechanism controlling said gear mechanism in operation, and stamping members.

Signed at the city of Montreal, Quebec, Canada, this 18th day of June, 1919.

GEORGE WILLIAM ODELL.